United States Patent
Hashmi et al.

(10) Patent No.: US 10,142,856 B2
(45) Date of Patent: Nov. 27, 2018

(54) TECHNIQUE FOR TRIGGERING MOBILITY MANAGEMENT SPECIFIC PROCEDURE TO AVOID REGISTRATION STATE MISMATCH BETWEEN USER EQUIPMENT AND NETWORK

(71) Applicant: Samsung Electronics Co., Ltd., Suwon-si, Gyeonggi-do (KR)

(72) Inventors: Danish Ehsan Hashmi, Bangalore (IN); Lalith Kumar, Bangalore (IN); Kailash Kumar Jha, Bangalore (IN); Jayashankara Dalagowdanahalli Malleshappa, Bangalore (IN); Suraj Kumar Singh, Bangalore (IN); Sunghoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 219 days.

(21) Appl. No.: 14/952,435

(22) Filed: Nov. 25, 2015

(65) Prior Publication Data
US 2016/0295395 A1  Oct. 6, 2016

(30) Foreign Application Priority Data
Oct. 12, 2015  (IN) .......................... 5617/CHE/2015

(51) Int. Cl.
*H04W 60/04*  (2009.01)
*H04W 24/02*  (2009.01)

(52) U.S. Cl.
CPC ........... *H04W 24/02* (2013.01); *H04W 60/04* (2013.01)

(58) Field of Classification Search
CPC ........... H04W 8/02; H04W 8/06; H04W 8/08; H04W 8/16; H04W 28/0226; H04W 60/04

USPC .......................................................... 370/328
See application file for complete search history.

(56) References Cited

U.S. PATENT DOCUMENTS

| | | | |
|---|---|---|---|
| 2010/0035609 A1* | 2/2010 | Hui .................. | H04W 8/06 455/433 |
| 2011/0013623 A1* | 1/2011 | Hu ................... | H04W 68/12 370/355 |
| 2011/0201343 A1* | 8/2011 | Pinheiro .......... | H04W 76/046 455/450 |
| 2012/0106324 A1* | 5/2012 | Keller .............. | H04W 8/20 370/225 |
| 2012/0120789 A1* | 5/2012 | Ramachandran .......................... H04W 36/0022 370/220 |
| 2012/0157093 A1* | 6/2012 | Zhu ................. | H04W 60/00 455/433 |

(Continued)

OTHER PUBLICATIONS

3GPP TS 24.008 V9.3.0 (Jun. 2010).*

*Primary Examiner* — Phong La
(74) *Attorney, Agent, or Firm* — Jefferson IP Law, LLP (57) ABSTRACT

A method in a mobile station (MS) and an MS in a wireless communication network are provided. The method includes detecting an intersystem change from an S1mode to one of an A/Gb mode and an Iu mode, detecting that a routing area update (RAU) has failed detecting that a successful generic location updating procedure has not been performed since the detected intersystem change, and triggering an MM specific procedure based on detecting that the RAU has failed and the successful generic location updating procedure has not been performed. The MM specific procedure corresponds to a location area update (LAU).

6 Claims, 5 Drawing Sheets

(56) References Cited

U.S. PATENT DOCUMENTS

| | | | |
|---|---|---|---|
| 2013/0107863 A1* | 5/2013 | Faccin | H04W 36/0022 370/331 |
| 2013/0150031 A1* | 6/2013 | Hedman | H04W 4/14 455/433 |
| 2013/0188601 A1* | 7/2013 | Sun | H04W 36/14 370/331 |
| 2014/0126536 A1* | 5/2014 | Niemi | H04W 60/02 370/331 |
| 2014/0153408 A1* | 6/2014 | Jun | H04L 65/1066 370/250 |
| 2015/0003228 A1* | 1/2015 | Choi | H04W 76/028 370/216 |
| 2015/0092665 A1* | 4/2015 | Choi | H04W 76/062 370/328 |

* cited by examiner

TECHNIQUE FOR TRIGGERING MOBILITY MANAGEMENT SPECIFIC PROCEDURE TO AVOID REGISTRATION STATE MISMATCH BETWEEN USER EQUIPMENT AND NETWORK

CROSS-REFERENCE TO RELATED APPLICATION(S)

This application claims the benefit under 35 U.S.C. § 119(a) of an Indian Provisional patent application filed on Nov. 7, 2014, in the Indian Patent Office and assigned Serial number 5617/CHE/2014, and of an Indian Complete patent application filed on Oct. 12, 2015, in the Indian Patent Office and assigned Serial number 5617/CHE/2015, the entire disclosure of each of which is hereby incorporated by reference.

TECHNICAL FIELD

The present disclosure relates to wireless communications. More particularly, the present disclosure relates to a method for triggering a mobility management (MM) specific procedure in a wireless communication network after detecting an intersystem change, a routing area update (RAU) has failed, and a successful generic location updating procedure has not been performed.

BACKGROUND

In today's wireless telecom scenarios, as technology such as Global System for Mobile Communications (GSM)/Universal Mobile Telecommunications System (UMTS)/long-term evolution (LTE) progress towards more efficient band utilization, there is also continuous need of maintaining a quality of services (QoS) with existing mobile features such as short message service (SMS), multimedia messaging service (MMS), Browsing, Emergency services, and so on. One of the important features is mobile originated (MO)/mobile terminated (MT) call. As per current implementation, there are cases, where user equipment (UE) can miss an MT call paging due to a state mismatch between the UE and a wireless communication network.

For example, a UE was registered initially for both circuit switched (CS) and evolved packet system (EPS) services with a mobility management entity (MME). If the UE reselects to a universal terrestrial radio access network (UTRAN)/GSM enhanced data rates for GSM evolution (EDGE) radio access network (GERAN) cell (also referred to as an intersystem change), but in a same location area identity (LAI) as a registered LAI. In this case the MM does not perform a location area update (LAU). Then a general packet radio service (GPRS) mobility management (GMM) initiates routing area update (RAU) and receives an RAU Reject due to a network failure at a serving GPRS support node (SGSN), and the GMM attempts to update its state and start timer T3302 (after an attempt counter has reached 5 failed attempts). The MM is assumes that it is in a registered area of a mobile switching center (MSC), and hence not performing the LAU, and even the GMM has failed to perform an RAU successfully. Hence, the context of the UE is not transferred from an S1 mode to an Iu/AGb mode. For the MME, the UE is still in its registered area. This results in a registration state mismatch between the UE and the wireless communication network. Further, if there is any MT paging for the UE, the MSC forwards the paging to the MME through a serving GPRS support (SGs) interface. The MME pages the UE in the LTE area, but the UE is actually in the UTRAN/GERAN area. Hence, the UE will miss the MT paging.

In another example, after the intersystem change from the S1 mode to an Iu mode or an A/Gb mode, even though the UE is in an MM registered area, the RAU was attempted. If GMM still fails to successfully register with the network due to an RAU reject from the wireless communication network (due to congestion, network failure at a serving GPRS support node (SGSN), and so on), the UE misses the MT Call paging.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for triggering a mobility management (MM) specific procedure after detecting an intersystem change, when a routing area update (RAU) has failed and a successful generic location updating procedure has not been performed since the intersystem change.

Another aspect of the present disclosure is to provide a method in a mobile station (MS). The method includes detecting an intersystem change from an S1 mode to one of an A/Gb mode and an Iu mode, detecting that an RAU has failed, detecting that a successful generic location updating procedure has not been performed since the detected intersystem change, and triggering an MM specific procedure based on detecting that the RAU has failed and the successful generic location updating procedure has not been performed. The MM specific procedure corresponds to a location area update (LAU).

Another aspect of the present disclosure is to provide an MS in a wireless communication network. The MS is configured to detect an intersystem change from an S1 mode to one of an A/Gb mode and an Iu mode, detect that an RAU has failed, detect that a successful generic location updating procedure has not been performed since the detected intersystem change, and trigger an MM specific procedure based on detecting that the RAU has failed and the successful generic location updating procedure has not been performed. The MM specific procedure corresponds to an LAU.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the spirit and scope of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the description, the terms mobile station (MS) and user equipment (UE) may be used interchangeably.

The embodiments herein achieve a method for triggering a mobility management (MM) specific procedure. The method includes detecting an intersystem change from an S1 mode (e.g., in long term evolution (LTE)) to either an A/Gb mode (e.g., in global system for mobile communications (GSM) enhanced data rates for GSM evolution (EDGE) radio access network (GERAN)) or an Iu mode (e.g., in universal terrestrial radio access network (UTRAN)). The method includes detecting that a routing area update (RAU) has failed. The method includes detecting that a successful generic location updating procedure has not been performed since the detected intersystem change. The method includes triggering the MM specific procedure based on detecting that the RAU has failed and the successful generic location updating procedure has not been performed. In an embodiment of the present disclosure, the MM specific procedure corresponds to a location area update (LAU).

In an embodiment of the present disclosure, an RAU attempt counter that is greater than or equal to 5 indicates that RAU has failed 5 times (as specified in $3^{rd}$ generation partnership program (3GPP) technical specification (TS) 24.008 and 4.7.5.1.5—Abnormal cases in MS mentioned below).

4.7.5.1.5—Abnormal Cases in the MS

If the routing area updating attempt counter is greater than or equal to 5:

A general packet radio service (GPRS) MS operating in MS operation mode A or B in network operation mode II, which is configured to use circuit switched (CS) fallback and short message service (SMS) over SGs, or SMS over SGs only, and which did not perform a successful generic location updating procedure since the last intersystem change from the S1 mode to the A/Gb or the Iu mode, shall proceed with appropriate MM specific procedures.

In an embodiment of the present disclosure, the RAU has failed when a normal and periodic RAU procedure has not been accepted by a wireless communication network (as specified in 3GPP TS 24.008 and 4.7.5.1.4—Normal and periodic routing area updating procedure not accepted by the network, as mentioned below). In an example, the wireless communication network can send the reject cause to indicate that the network has not accepted the normal and periodic RAU procedure sent by the UE.

4.7.5.1.4—Normal and Periodic Routing Area Updating Procedure Not Accepted by the Network:

Reject-9 (MS identity cannot be derived by the network): a GPRS MS operating in MS operation mode A or B in network operation mode II which is configured to use CS fallback and SMS over SGs, or SMS over SGs only, and which did not perform a successful generic location updating procedure since the last intersystem change from the S1 mode to the A/Gb or the Iu mode, shall proceed with appropriate MM specific procedures. Additionally, a GPRS MS operating in MS operation mode A or B in network operation mode II shall initiate a GPRS attach procedure Reject-10 (Implicitly detached): a GPRS MS operating in MS operation mode A or B in network operation mode II which is configured to use CS fallback and SMS over SGs, or SMS over SGs only, and which did not perform a successful generic location updating procedure since the last intersystem change from S1 mode to A/Gb or Iu mode, shall proceed with appropriate MM specific procedures.

Unlike conventional systems, the proposed method avoids the missing of paging for a mobile terminated (MT) call or MT CS services. The proposed method avoids wasting of time by an MS in attempting to update state after the RAU failure to bring back the CS services. Further, the proposed method avoids wastage of paging resources in the LTE area, when the UE is camped in a Legacy radio access technology (RAT). The method also avoids registration state mismatch between the MS and the wireless communication network.

Referring now to the drawings, and more particularly to FIGS. 1 through 4B, where similar reference characters denote corresponding features consistently throughout the figures, there are shown preferred embodiments.

Figure 1:
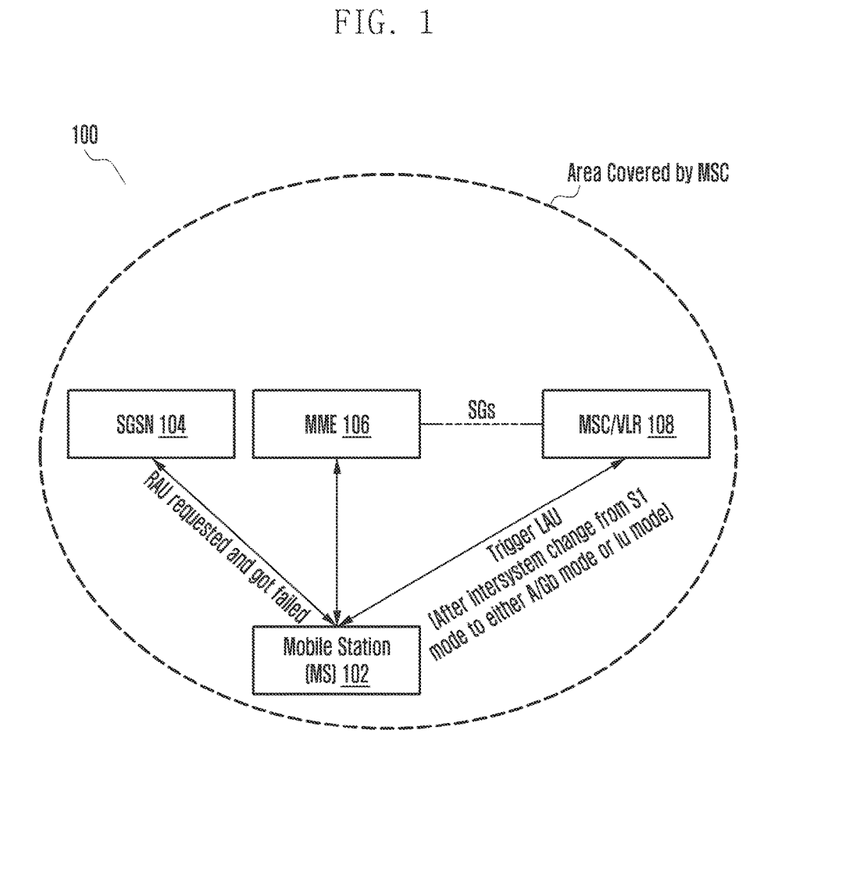
FIG. 1 illustrates generally a high level overview of a wireless communication network in which a mobile station (MS) triggers a mobility management (MM) specific procedure according to various embodiments of the present disclosure.

FIG. 1 illustrates generally a high level overview of wireless communication network 100 in which a MS triggers an MM specific procedure according to various embodiments of the present disclosure.

Referring to FIG. 1, the wireless communication network 100 includes an MS 102, a serving GPRS support node (SGSN) 104, a mobility management entity (MME) 106, and a mobile switching center (MSC)/visitor location register (VLR) 108. The MS 102 is in communication with the SGSN 104, the MME 106, and the MSC/VLR 108. The MME 106 is in communication with the MSC/VLR 108 over an SGs interface. The SGs interface is a reference point between the MME 106 and MSC/VLR 108. The SGs interface is used for the MM and paging procedures between an evolved packet system (EPS) domain and a CS domain. The MS 102 can be, for example but not limited to, a mobile communication device, a mobile wireless device, a tablet, a handset, a smart phone, a laptop, or any other communication device. The MS 102 can include one or more antennas configured to communicate with a base station (BS), an evolved Node B (eNB), or other type of nodes in the wireless communication network 100.

The SGSN 104 is a node that is serving the MS 102. The SGSN 104 supports a GPRS for the A/Gb mode (i.e., the Gb interface) and/or Iu-mode (i.e., the Iu interface).

Initially, the MS 102 is registered for both CS and EPS services with the MME 104. The MS 102 detects an intersystem change from the S1 mode (e.g., in LTE) to either the A/Gb mode (e.g., in GERAN) or the Iu mode (e.g., in UMTS) since MS 102 has reselected to one of a UMTS cell or a GERAN cell. Further, the MS 102 is configured to detect that the RAU has failed. The MS 102 send the RAU request to the SGSN 104. In response, the SGSN 104 sends RAU failure to the MS 102.

If the MS 102 detects that the normal and periodic RAU procedure has not been accepted by the wireless communication network 100, then the MS 102 triggers the MM specific procedure which corresponds to an LAU request.

The MS 102 sends the LAU request to the MSC/VLR 108. In response, the MSC/VLR 108 sends the LAU accept response to the MS 102. The mechanism defined in the 3GPP specification follows.

FIG. 1 shows a limited overview of the wireless communication network 100, but it is to be understood that other embodiments are not limited thereto. Further, the wireless communication network 100 can include any number other hardware or software components communicating with each other. For example, the component can be, but is not limited to, a process running in the controller or processor, an object, an executable process, a thread of execution, a program, or a computer. By way of illustration, both an application running on a device and the device itself can be a component.

Figure 2:
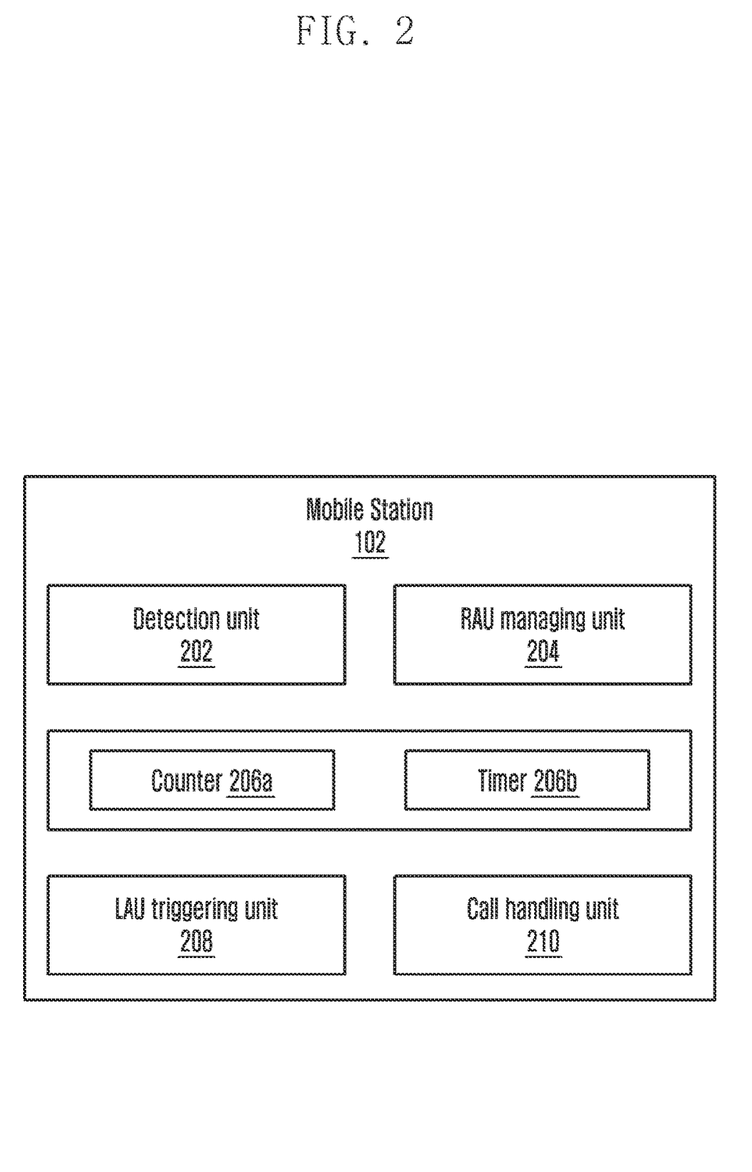
FIG. 2 illustrates various components in the MS according to various embodiments of the present disclosure.

FIG. 2 illustrates various units in the MS 102 according to various embodiments of the present disclosure.

Referring to FIG. 2, the MS 102 includes a detection unit (detector) 202, an RAU managing unit (RAU manager) 204, a counter 206a, a timer 206b, an LAU triggering unit (LAU trigger) 208, and a call handling unit (call handler) 210. The detection unit 202 is configured to detect the intersystem change from the S1 mode to either the A/Gb mode or the Iu mode. The detection unit 202 is configured to detect that the RAU has failed. The detection unit 202 is configured to detect that the successful generic location updating procedure has not been performed since the detected intersystem change. The RAU managing unit 204 is configured to detect that the normal and periodic RAU procedure has not been accepted by the wireless communication network 100. The LAU triggering unit 208 is configured to trigger the MM specific procedure, when the normal and periodic RAU procedure has not been accepted by the wireless communication network 100.

In an embodiment of the present disclosure, after receiving the RAU failure from the wireless communication network 100, the counter 206a is configured to perform the RAU attempts at least 5 times. The LAU triggering unit 208 is configured to trigger the MM specific procedure, when the RAU attempt counter is greater than or equal to 5. In an embodiment of the present disclosure, the triggering involves sending the LAU request to the wireless communication network 100.

In response, the LAU triggering unit 208 is configured to receive the LAU accept from the wireless communication network 100. The wireless communication network 100 sends the paging for the MT call, and the call handling unit 210 is configured to send the paging response to the wireless communication network 100. The call handling unit 210 is configured to handle the MT call.

Although FIG. 2 shows various units of the MS 102, in other implementations, the MS 102 may include fewer components, different components, or additional components than depicted in the FIG. 2. Additionally or alternatively, one or more components of the MS 102 may perform functions described as being performed by one or more other components of the MS 102.

Figure 3:
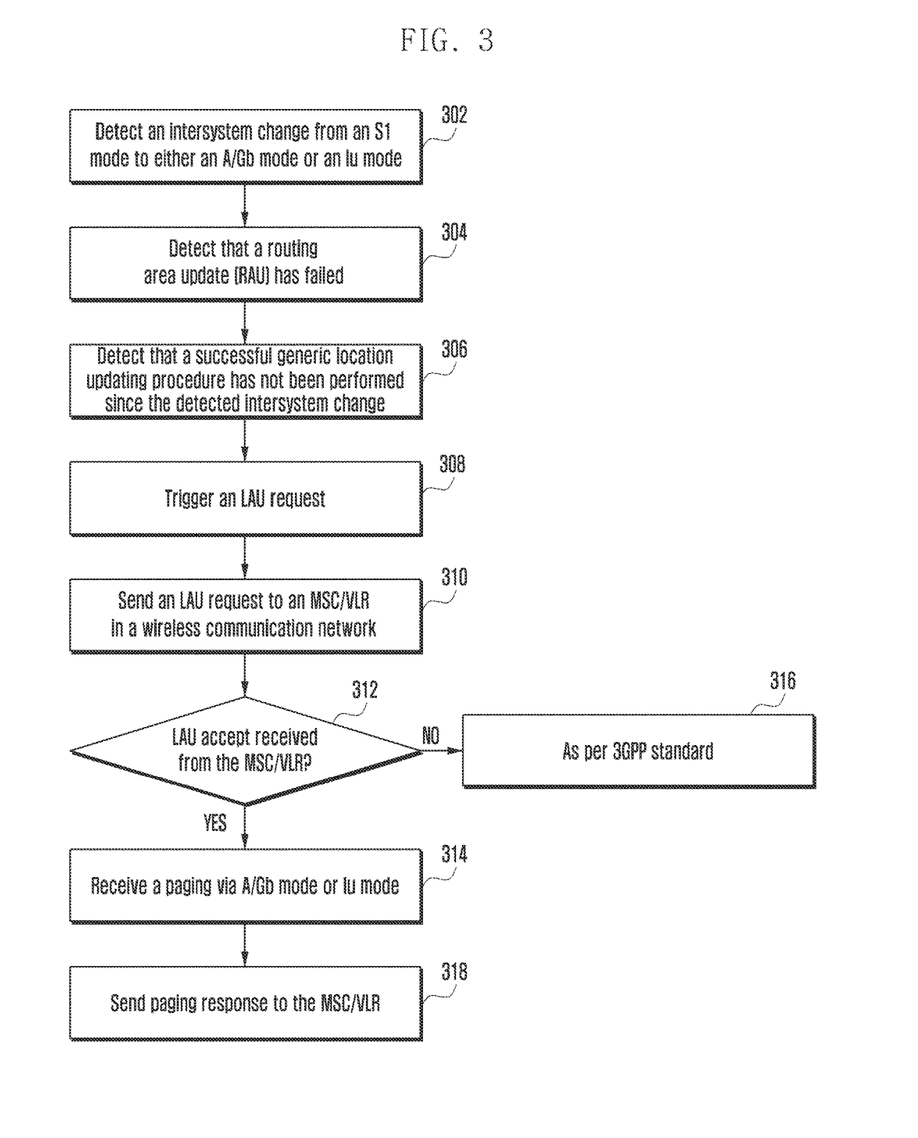
FIG. 3 is a flow diagram illustrating a method for triggering the MM specific procedure according to various embodiments of the present disclosure.

FIG. 3 is a flow diagram illustrating a method 300 for triggering the MM specific procedure to the wireless communication network according to various embodiments of the present disclosure.

Referring to FIG. 3, at operation 302, the method 300 includes detecting the intersystem change from the S1 mode to either the A/Gb mode or the Iu mode. In an embodiment of the present disclosure, the method 300 allows the detection unit 202 to detect the intersystem change from the S1 mode to either the A/Gb mode or the Iu mode. The intersystem change refers to the cell reselection by the MS 102 from the LTE to either UMTS or GERAN. At operation 304, the method 300 includes detecting that the RAU has failed. In an embodiment of the present disclosure, the method 300 allows the detection unit 202 to detect that the RAU has failed.

At operation 306, the method 300 includes detecting that a successful generic location updating procedure has not been performed since the detected intersystem change. In an embodiment of the present disclosure, the method 300 allows the detection unit 202 to detect that the successful generic location updating procedure has not been performed since the detected intersystem change.

At operation 308, the method 300 includes triggering the MM specific procedure based on detecting that the RAU has failed and detecting that the successful generic location updating procedure has not been performed. In an embodiment of the present disclosure, the method 300 allows the LAU triggering unit 208 to trigger the MM specific procedure based on detecting that the RAU has failed and detecting that the successful generic location updating procedure has not been performed. In an embodiment of the present disclosure, the MM specific procedure corresponds to an LAU request.

At operation 310, the method 300 includes sending the LAU request to the MSC/VLR 108 in the wireless communication network 100. In an embodiment of the present disclosure, the method 300 allows the LAU triggering unit 208 to send the LAU request to the MSC/VLR 108 in the wireless communication network 100.

At operation 312, the method 300 includes determining whether the LAU accept received from the MSC/VLR 108. In an embodiment of the present disclosure, the method 300 allows the LAU triggering unit 208 to determine whether the LAU accept received from the MSC/VLR 108. If the LAU accept is received from the MSC/VLR 108, at operation 314 the method 300 includes receiving the paging via the A/Gb mode or the Iu mode. In an embodiment of the present disclosure, the method 300 allows the call handling unit 210 to receive the paging via the A/Gb mode or the Iu mode. If the LAU accept is not received from the MSC/VLR 108, at operation 316 the method 300 includes performing actions as per the 3GPP standard.

At operation 318, the method 300 includes sending a paging response to the MSC/VLR 108. In an embodiment of the present disclosure, the method 300 allows the call handling unit 210 to send the paging response to the MSC/VLR 108. The proposed method 300 avoids the registration state mismatch between the MS 102 and the wireless communication network 100.

The various actions, acts, blocks, steps, and the like in the method 300 may be performed in the order presented, in a different order or simultaneously. Further, in some embodiments of the present disclosure, some actions, acts, blocks, steps, and the like may be omitted, added, modified, skipped, and the like without departing from the scope of the present disclosure.

Figure 4A:
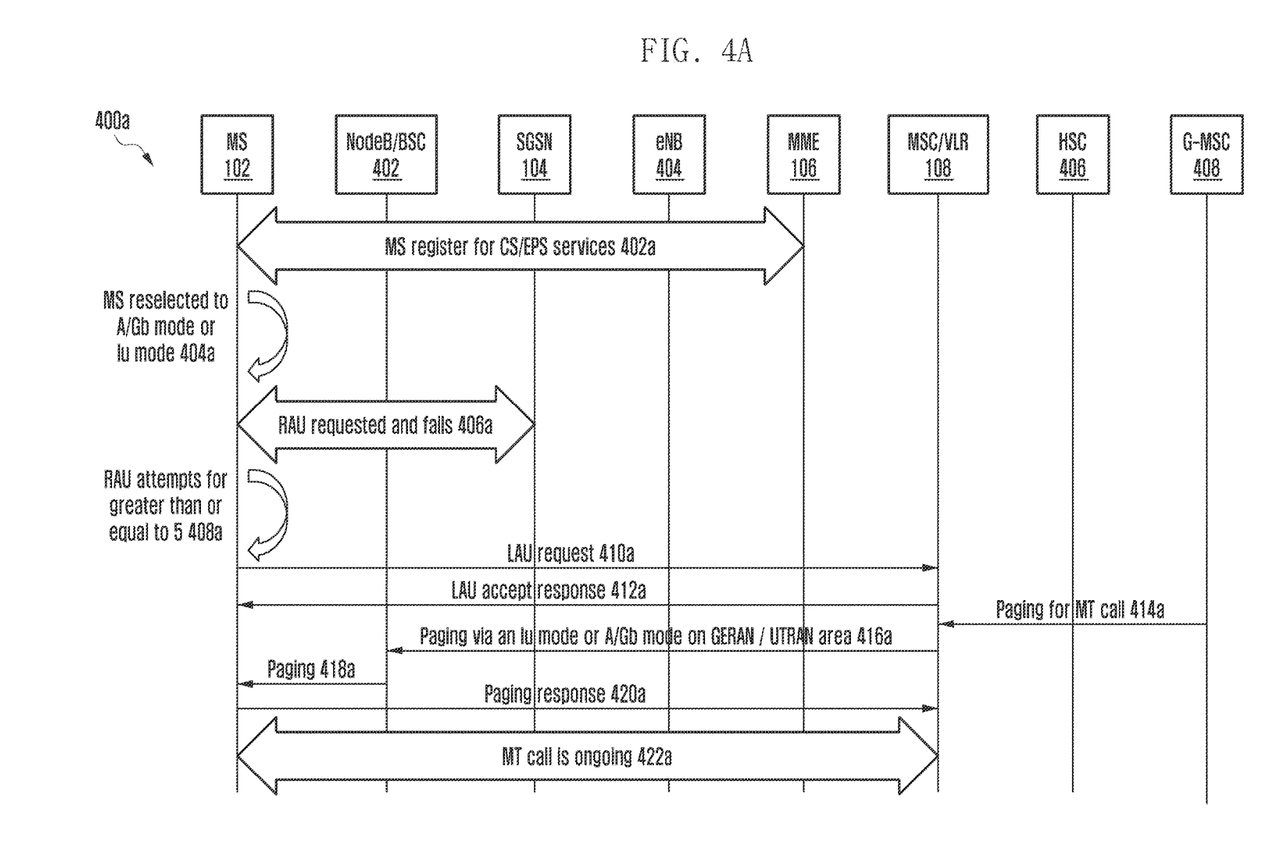
FIG. 4A is a sequence diagram explaining steps involved in triggering a location area update (LAU) when a routing area updating (RAU) attempt counter is greater than or equal to 5 according to various embodiments of the present disclosure.

FIG. 4A is a sequence diagram explaining operations involved in triggering the LAU when the RAU attempt counter is greater than or equal to 5, according to various embodiments of the present disclosure.

Referring to FIG. 4A, initially, the MS 102 registers at operation 402a for the CS/EPS services with the MME 106 in S1 mode, and the MS 102 reselects at operation 404a to either the A/Gb mode or the Iu mode. When the MS 102 has reselected to either the A/Gb mode or the Iu mode, the MS 102 sends at operation 406a the RAU request to the SGSN 104 and the MS 102 receives the RAU failure from the SGSN 104.

The MS 102 determines at operation 408a that an RAU attempt counter is greater than or equal to 5, indicating that the RAU has failed 5 times. Then, the MS 102 sends at operation 410a the LAU request to the MSC/VLR 108. In response to the LAU request received from the MS 102, the MSC/VLR 108 sends at operation 412a the LAU accept response to the MS 102. The Gateway Mobile Switching Centre (G-MSC) 408 sends at operation 414a a paging for MT call to the MSC/VLR 108. Then, the MSC/VLR 108 sends at operation 416a the paging via the Iu mode or the A/Gb mode on the GERAN or UTRAN area to a NodeB/base station controller (BSC) 402. After receiving the paging via the Iu mode or the A/Gb mode, the NodeB/BSC 402 sends at operation 418a the paging to the MS 102. In response, the MS 102 sends at operation 420a the paging response to the MSC/VLR 108. This avoids the registration state mismatch between the MS 102 and the MSC/VLR 108. Then the MS 102 continues at operation 422a the MT call with the MSC/VLR 108.

Figure 4B:
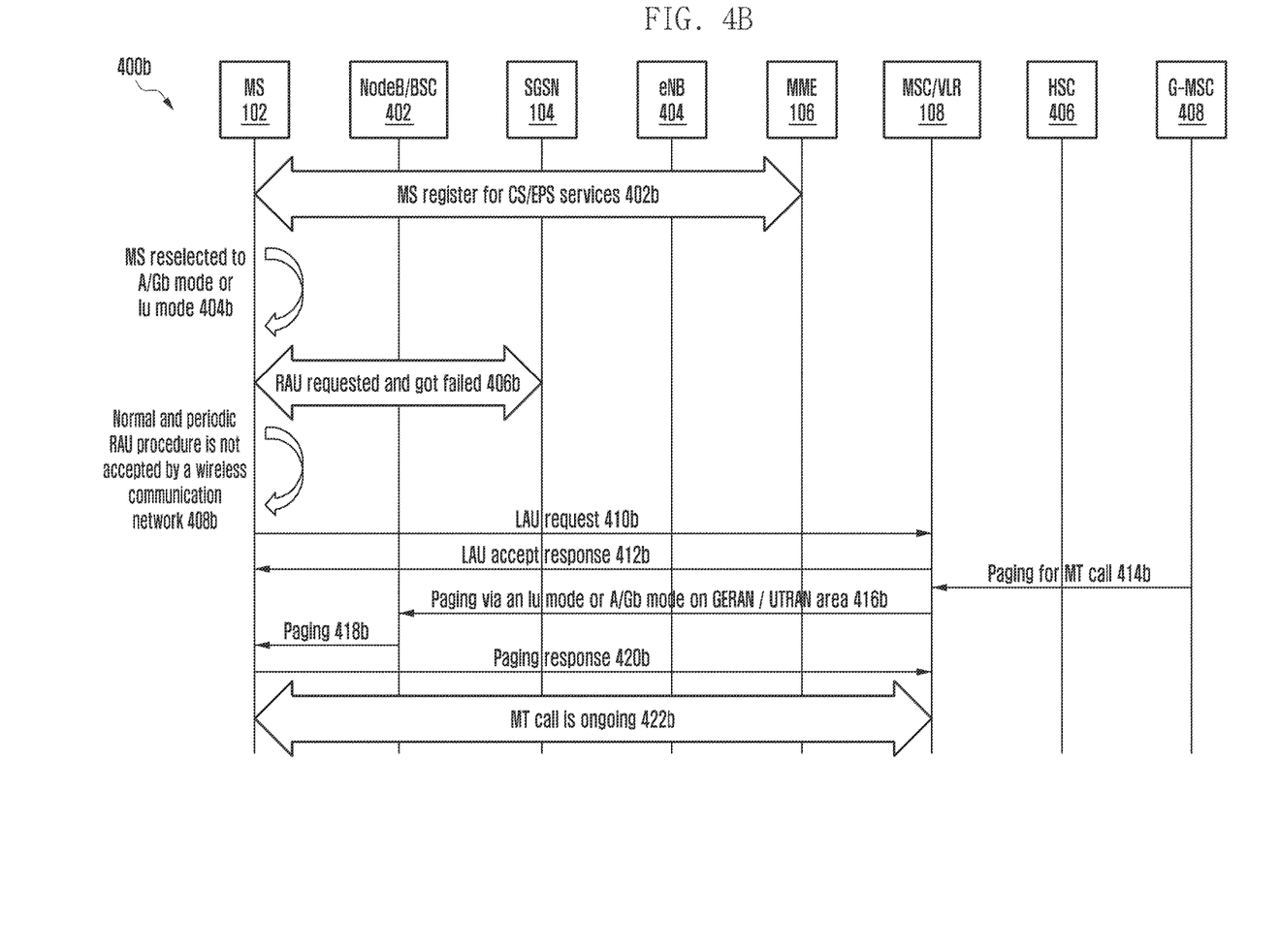
FIG. 4B is a sequence diagram explaining steps involved in triggering an LAU when a normal and periodic RAU procedure is not accepted by a wireless communication network according to various embodiments of the present disclosure.

FIG. 4B is a sequence diagram explaining steps involved in triggering the LAU when the normal and periodic RAU procedure has not been accepted by the wireless communication network 100 according to various embodiments of the present disclosure.

Referring to FIG. 4B, initially, the MS 102 registers at operation 402b for the CS/EPS services with the MME 106 in S1 mode, and the MS 102 reselects at operation 404b to either the A/Gb mode or the Iu mode. When the MS 102 reselects to either the A/Gb mode or the Iu mode, the MS 102 sends at operation 406b the RAU request to the SGSN 104 and the MS 102 receives the RAU failure from the SGSN 104.

The MS 102 determines at operation 408b the normal and periodic RAU procedure has not been accepted by the wireless communication network 100 (due to problems such as congestion, network failure at the SGSN, and so on). The wireless communication network 100 indicates the non-acceptance of the normal and periodic RAU procedure by sending a reject cause. Then the MS 102 sends at operation 410b the LAU request to the MSC/VLR 108. In response, the MSC/VLR 108 sends at operation 412b the LAU accept response to the MS 102.

The G-MSC 408 sends at operation 414b a paging for MT call to the MSC/VLR 108. Then the MSC/VLR 108 sends at operation 416b the paging via the Iu mode or the A/Gb mode on the GERAN or UTRAN area to the NodeB/BSC 402. Then the NodeB/BSC 402 sends at operation 418b the paging to the MS 102. In response, the MS 102 sends at operation 420b the paging response to the MSC/VLR 108 and the MS 102 continues at operation 422b the MT call with the MSC/VLR 108.

The embodiments disclosed herein can be implemented through at least one software program running on at least one hardware device and performing network management functions to control the elements. The elements shown in FIGS. 1, 2, 4A, and 4B include blocks which can be at least one of a hardware device, or a combination of hardware device and software module.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in a mobile station (MS), the method comprising:
   detecting an intersystem change from an S1 mode to one of an A/Gb mode and an Iu mode;
   detecting that a routing area update (RAU) has failed since the detected intersystem change;
   detecting that a successful generic location updating procedure has not been performed since the detected intersystem change; and
   performing a mobility management (MM) specific procedure when the RAU has failed and the successful generic location updating procedure has not been performed since the detected intersystem change,
   wherein the MM specific procedure corresponds to a location area update (LAU).

2. The method of claim 1, wherein the performing of the MM specific procedure comprises determining that an attempt counter is greater than or equal to five (5) indicating that the RAU has failed five (5) times.

3. The method of claim 1, wherein the RAU has failed when a normal and periodic RAU procedure has not been accepted by a wireless communication network.

4. A mobile station (MS) in a wireless communication network, the MS comprising:
   a transceiver; and
   at least one processor configured to:
      detect an intersystem change from an S1 mode to one of an A/Gb mode and an Iu mode,
      detect that a routing area update (RAU) has failed since the detected intersystem change,
      detect that a successful generic location updating procedure has not been performed since the detected intersystem change, and
      perform, via the transceiver, a mobility management (MM) specific procedure when the RAU has failed and the successful generic location updating procedure has not been performed since the detected intersystem change, wherein the MM specific procedure corresponds to a location area update (LAU).

5. The MS of claim 4, wherein the at least one processor is further configured to perform the MM specific procedure in response to determining that an attempt counter is greater than or equal to five (5) indicating that the RAU has failed five (5) times.

6. The MS of claim 4, wherein the RAU has failed when a normal and periodic RAU procedure has not been accepted by a wireless communication network.

* * * * *